J. L. RICHARDSON.
MUD TREAD OR SHOE.
APPLICATION FILED OCT. 26, 1915.
1,173,683.
Patented Feb. 29, 1916.
2 SHEETS—SHEET 2.
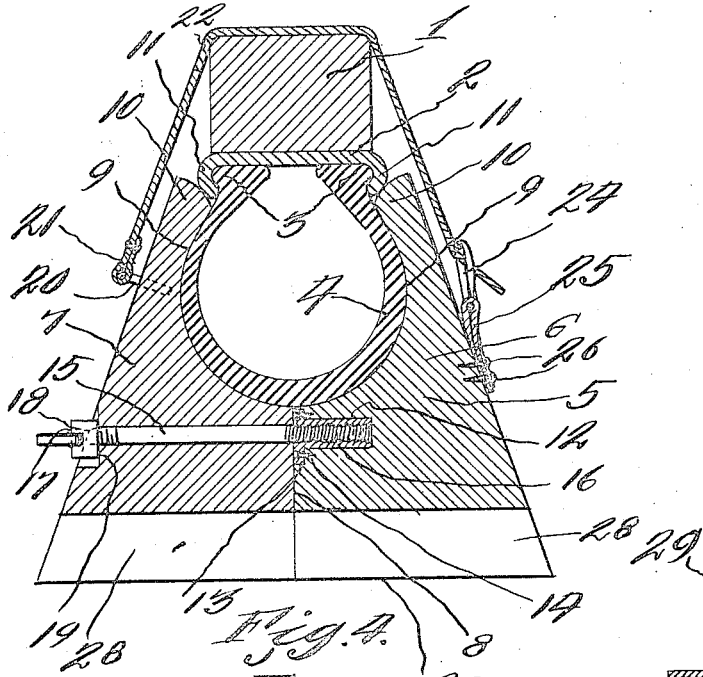
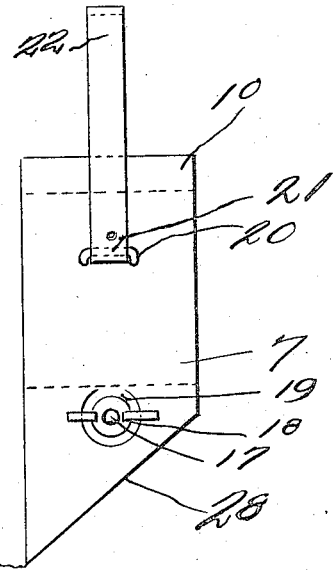
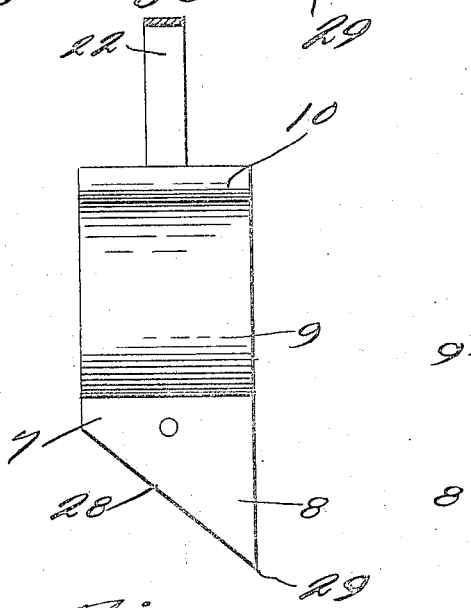
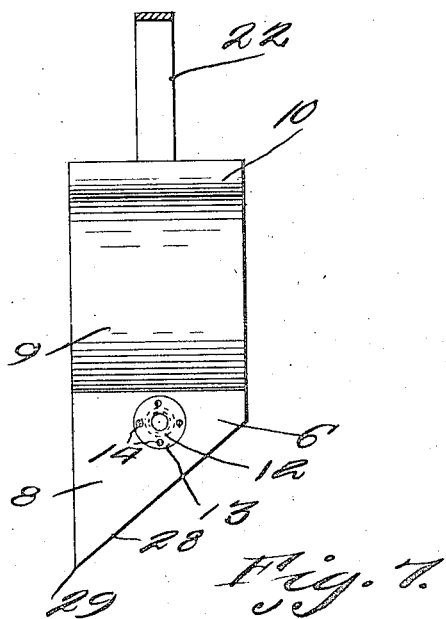
Witnesses
Frances S. Boswell
Philip Terrill
Inventor
J. L. Richardson
By D. Swift & Co.
Attorneys

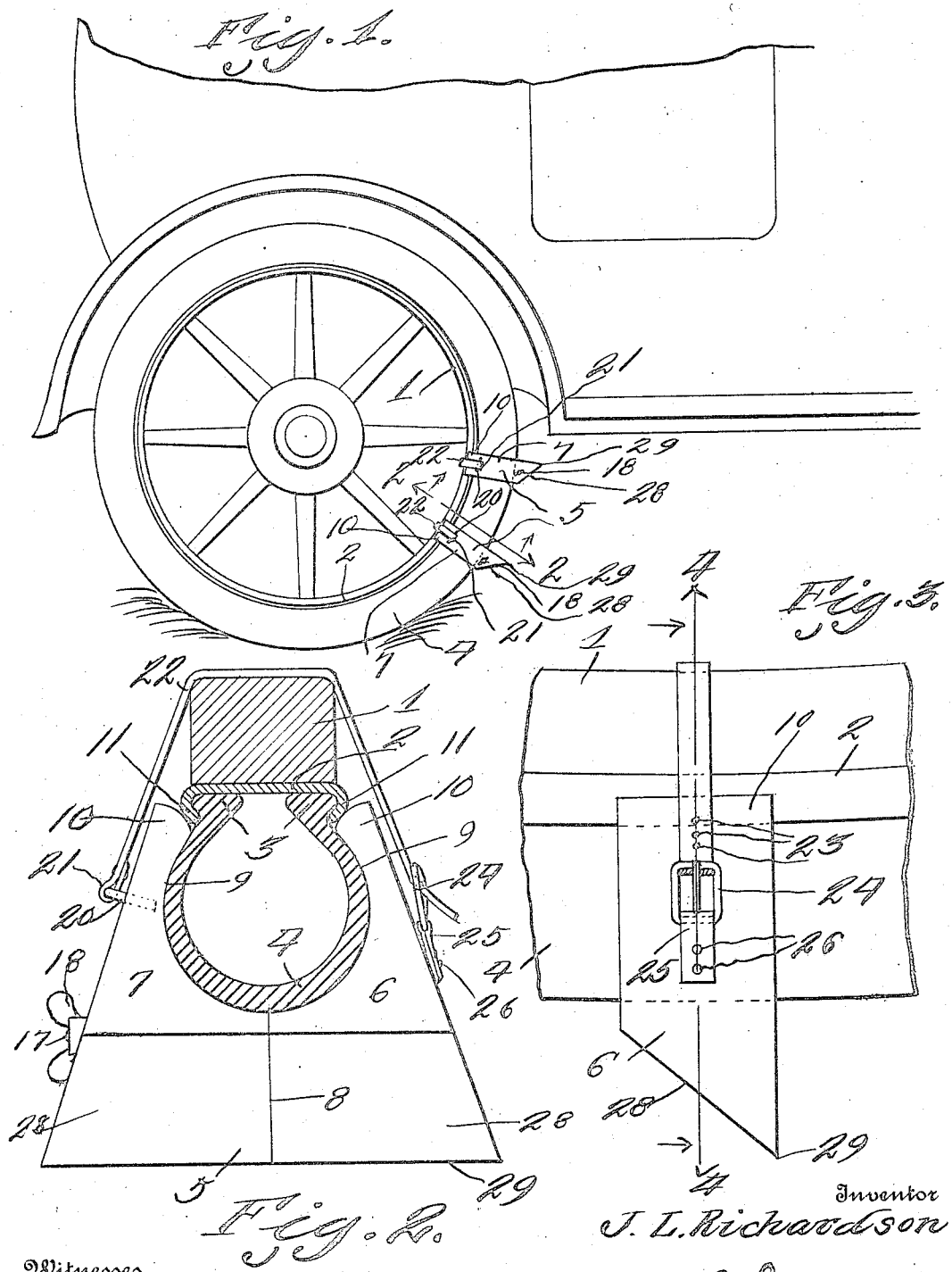

UNITED STATES PATENT OFFICE.

JOSEPH L. RICHARDSON, OF BLACKSHEAR, GEORGIA.

MUD TREAD OR SHOE.

1,173,683. Specification of Letters Patent. Patented Feb. 29, 1916.

Application filed October 26, 1915. Serial No. 57,946.

*To all whom it may concern:*

Be it known that I, JOSEPH L. RICHARDSON, a citizen of the United States, residing at Blackshear, in the county of Pierce, State of Georgia, have invented a new and useful Mud Tread or Shoe; and I do hereby declare the following to be a full, clear, and exact description of the invention, such as will enable others skilled in the art to which it appertains to make and use the same.

This invention relates to an improved mud tread or shoe for automobile wheel tires, and an object of the invention is to provide a device of this nature, which, when applied to the tire of the wheel, as shown in the drawings, constitutes means whereby the surfaces of the beveled portions come in contact with the sand or mud to raise or lift the wheel, as the wheel moves forward, which, as one shoe or tread passes, it is supported by the succeeding shoe or tread, and so on, thereby acting to keep the wheel extracated from the mud or sand or the like.

Another object of the invention is to provide a device of this nature including improved features of construction.

One of the features of construction consists in providing a series of tread blocks or shoes, each consisting of two sections, oppositely disposed and being clamped to opposite sides of the tire, there being a threaded element clamping the two sections together, in combination with an adjustable strap connection arching the rim of the wheel, to further secure the tread block or shoe to the wheel.

In practical fields the details of construction may necessitate alterations, falling within the scope of what is claimed.

The invention comprises further features and combination of parts, as hereinafter set forth, shown in the drawings and claimed.

In the drawings: Figure 1 is a view in side elevation of a portion of an automobile, showing two mud treads or shoes as applied to the wheel. Fig. 2 is a sectional view on line 2—2 of Fig. 1. Fig. 3 is an enlarged detail elevation of the mud tread or shoe. Fig. 4 is a sectional view on line 4—4 of Fig. 3. Fig. 5 is an enlarged side elevation of Fig. 4 showing the tire and rim of the wheel omitted. Fig. 6 is a view in elevation showing the inner face of one of the sections of the shoe. Fig. 7 is a view in elevation showing the inner face of the other section.

Referring more especially to the drawings, 1 designates the usual wood rim of an automobile wheel, whereas 2 denotes the usual clench rim, which receives the clench portions 3 of the tire 4. One or more mud treads or shoes 5 are applied to the tire, in the manner shown in the drawings. Each of these mud treads or shoes consists of two sections 6 and 7, the faces 8 of which contact with each other, while the inner curved faces 9 engage opposite sides of the tire 4, as shown clearly in Fig. 4 of the drawings. The end portions 10 of the sections extend toward the center of the wheel, and engage the clench flanges 11 of the rim 2, so that the tread or shoe, when it engages the ground will not depress the tire 4, where the tread or shoe is applied. In other words, the portions 10 and the clench flanges 11 coöperate to form abutting means, thereby preventing the tread or shoe from depressing the tire. A thimble or sleeve 12 is embedded in the section 5, and the sleeve or thimble has its flange 13 receiving suitable screws 14, which are threaded into the section 5, for holding the sleeve or thimble 12 in place. A rod or bolt 15 extends transversely of the section 7, and has its end portion 16 threaded into the thimble or sleeve 12, while its other threaded end 17 is provided with a nut 18 engaging the flat face 19 of the section 7, so as to securely hold the two sections of the tread or shoe firmly to the tire, in the manner illustrated in the drawings. The section 7 is provided with a staple or loop 20, to which the looped end 21 of the strap 22 is connected. This strap 22 arches over the rim 1, as shown clearly in Fig. 4, and has its other end (which is provided with a series of apertures or openings 23) adjustably connected to a suitable buckle 24, which is connected to the strap 25, which in turn is secured at 26 to the section 6 of the mud tread or shoe. By virtue of the strap 22 the mud tread or shoe is additionally secured, not only to the tire 4, but also to the rim 1.

The shoe or tread is beveled as shown at 28 in the direction of travel of rotation of the wheel, and which wheel in its rotation and the machine is lifted and supported from one level to another of said shoes or treads, and the edge 29 assists in preventing the wheel from slipping.

The invention having been set forth, what is claimed as new and useful is:—

1. A mud tread or shoe for attachment to a vehicle wheel having a pneumatic tire, said shoe being substantially triangular in cross section and having its end beveled in the direction of the rotation of the wheel thereby providing surfaces coming in contact with the sand or mud to raise or lift the wheel gradually as the wheel rotates, said shoe consisting of two sections, a portion of the inner face of each section being curved to engage one side of the tire, the other portion of the inner face of each section having a flat surface to engage the corresponding flat surface of the other section, means for holding the sections together to assist in securing the tread or shoe to the tire, each section adjacent one end of the inner curved surface abutting against the clench flanges of the clench rim constituting limiting means, to prevent the tread or shoe from depressing the tire, and a strap arching the wheel rim to additionally secure the tread to the tire and rim.

2. A mud tread or shoe for attachment to a vehicle wheel having a pneumatic tire, said shoe being substantially triangular in cross section and having its end beveled in the direction of the rotation of the wheel, thereby providing a surface coming in contact with the sand or mud to raise or lift the wheel gradually as the wheel rotates, said shoe consisting of two sections, a portion of the inner face of each section being curved to engage the side of the tire, the other portion of the inner face of which section having a flat surface to engage the corresponding flat surface of the other section, one of the sections adjacent its inner flat surface having a socket member embedded therein, a thumb screw threaded transversely through the other section and having threaded connections with the socket member to draw the two sections together, so that the curved surfaces of the sections will fit tight against the opposite sides of the tire, each section adjacent one end of the inner curved surface abutting against the clench flange of the clench rim constituting limiting means to prevent the shoe from depressing the tire, and a strap arching the wheel rim to additionally secure the shoe to the tire and rim.

In testimony whereof I have signed my name to this specification in the presence of two subscribing witnesses.

JOSEPH L. RICHARDSON.

Witnesses:
  M. W. McALPIN,
  J. K. DYKES.